United States Patent [19]

Scharf

[11] 4,058,466
[45] Nov. 15, 1977

[54] BROMINATED CARBAMOYL DERIVATIVES

[75] Inventor: Daniel J. Scharf, East Amherst, N.Y.

[73] Assignee: Hooker Chemicals & Plastics Corporation, Niagara Falls, N.Y.

[21] Appl. No.: 537,526

[22] Filed: Dec. 30, 1974

[51] Int. Cl.$^2$ .................. C09K 3/28; C07C 125/04; C07C 125/06
[52] U.S. Cl. ........................ 252/8.1; 8/187; 8/194; 427/439; 428/921; 560/24; 560/115; 560/121; 560/166
[58] Field of Search .................. 252/8, 1; 8/187, 194; 260/482 B, 482 C, 468 E, 471 C; 427/439; 428/921

[56] References Cited

U.S. PATENT DOCUMENTS

| | | | |
|---|---|---|---|
| 2,837,560 | 6/1958 | Beinfest et al. | 260/482 |
| 3,059,023 | 10/1962 | Rink et al. | 260/482 |
| 3,092,656 | 6/1963 | Powell | 260/482 |
| 3,133,959 | 5/1964 | Seifter et al. | 260/482 |
| 3,391,181 | 7/1968 | Scheuerl | 260/482 |
| 3,421,923 | 1/1969 | Guth | 427/377 X |
| 3,647,916 | 8/1953 | Kaiser | 260/482 X |
| 3,829,289 | 8/1974 | Tesoro | 252/8.1 X |
| 3,850,878 | 11/1974 | Murtha et al. | 260/482 X |
| 3,920,459 | 11/1975 | Allen | 106/15 |

FOREIGN PATENT DOCUMENTS 238,554    1/1960    Australia .............................. 252/8.1

Primary Examiner—Herbert B. Guynn
Attorney, Agent, or Firm—P. F. Casella; W. J. Crossetta, Jr.

[57] ABSTRACT

Brominated carbamoyl derivatives of the structure:

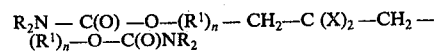

$R_2N — C(O) —O—(R^1)_n — CH_2—C(X)_2 —CH_2 —(R^1)_n —O—C(O)NR_2$ wherein:

R is independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;

$R^1$ is independently selected from the group consisting of alkylene; oxyalkylene, hydroxy substituted oxyalkylene, halogen substituted oxyalkylene and alkylene or oxyalkylene substituted by the group — O — C(O)NR$_2$;

X is selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; n is 0 to 20; preferably 0 to 6;

provided one of X is a bromo or a bromo substituted alkyl; and that each carbamoyl group has a replaceable hydrogen in the R group.

These compounds are useful to impart flame retardent property to combustible substrates.

18 Claims, No Drawings

BROMINATED CARBAMOYL DERIVATIVES

BACKGROUND OF THE INVENTION

Various materials have been suggested for imparting flame retardant character to combustible materials U.S. Pat. No. 3,456,041 employs a brominated phosphorus containing material. U.S. Pat. No. 3,642,944 relates to saturated polyester materials which are comprised of reaction products of chlorinated aromatic acids, and dibromoneopentyl glycol. Polyesters containing halogenated phenyl derivatives are described in U.S. Pat. No. 3,772,342. U.S. Pat. No. 3,324,205 teaches flame resistant compositions that are phosphorus containing, as does U.S. Pat. No. 3,830,886. Esters of carbamic acid are taught in U.S. Pat. No. 2,816,910, U.S. Pat. No. 3,391,181 and Belgium Pat. No. 614,347 dated Aug. 23, 1962, reported in Chemical Abstracts 58;3322F.

SUMMARY OF INVENTION

The invention is concerned with brominated carbamoyl derivatives having the structure.

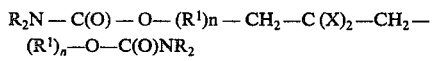

wherein:

R is independently selected from the group consisting of hydrogen, alkyl, alkanol, cycloalkyl of from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;

$R^1$ is independently selected from the group consisting of alkylene; oxyalkylene, hydroxy substituted oxyalkylene, halogen substituted oxyalkylene and alkylene or oxyalkylene substituted by the group — O — $C(O)NR_2$;

X is selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; n is 0 to 20; preferably 0 to 6;

provided one of X is a bromo or bromo substituted alkyl; and that each carbamoyl group has a replaceable hydrogen in the R group.

By a "replaceable" hydrogen is meant a hydrogen atom present in the R group which may become detached therefrom such as during the curing operation of the substrates treated with said compounds.

The compounds of the present invention are used to impart a flame retardant property to combustible materials such as synthetic resins, wood, paper, cellulose containing fibers and fabrics, and the like. In particular, the compounds of the present invention impart flame retardant property to cellulosic containing fabrics by providing cross linking sites with the fabric.

DESCRIPTION OF PREFERRED EMBODIMENTS

Methods of preparation

There are several methods of preparing the compounds of the present invention. The first method is the reaction of a glycol (1 mole) with a carbamoyl chloride $H_2NC(O)Cl$ (2 mole) in the liquid phase. For example, the initial glycol could be a halogenated glycol, such as dibromo neopentylglycol. In order to prepare the variety of brominated carbamoyl derivatives a halogenated glycol may be reacted with an epihalohydrin, such as epichlorohydrin or epibromohydrin. Alternatively, the glycol may be reacted with various alkylene oxides, such as ethylene oxide, propylene oxide or butylene oxide to give the desired oxyalkylene glycol which can then be reacted with the appropriate carbamoyl chloride.

A second method of preparing the compounds of the present invention would be to react a halogenated glycol, such as dibromo neopentyl glycol with phenyl chloroformate. This reaction is a liquid phase reaction in pyridine as solvent at a temperature of about 0° to 5° centigrade. An intermediate product is a bis carbonate. The second step is to react the product of step one with liquid ammonia and chloroform at about minus 30° centigrade, resulting in the desired dicarbamate and phenol. The distinct advantage of this reaction is that resulting phenol can be recycled by reacting it with phosgene to produce the aforementioned phenyl chloroformate.

This method can be described as follows:

A method for producing brominated carbamoyl derivatives of the above structure comprising the steps:

1. reacting a halogenated glycol of the structure

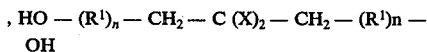

with an aryl halo formate of the structure

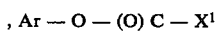

2. reacting the product of step 1 with ammonia; wherein aryl is from 6 to 12 carbon atoms and halo is $X^1$ and is selected from the group consisting of chloro and bromo.

Regardless of which of the aforementioned reaction schemes are employed to prepare the desired carbamate, — N — alkanol derivatives are the most preferred compounds. They are prepared by reacting the carbamate with aqueous formalin at a pH of 8 to 9 and a temperature of about 45° centigrade.

As can be seen from the aforementioned preparative reactions, the final product obtained is the result of the starting alcoholic materials that are employed.

The alcohols can be described by the structure HO — $(R^1)$ — $CH_2$ — C $(X)_2$ — $CH_2$ — $(R^1)_n$ — OH. Listed below are preferred alcohols that may be employed in the preparation of the compounds of the present invention.

HO — $CH_2$ — C $(CH_2Br)_2$ — $CH_2$ — OH;

HO — $(CH_2)$ — C $(CH_2Br)_2$ — $C_6H_4$— OH;

HO — $C_6H_4$ — $CH_2$ — C $(CH_2Br)_2$ — $CH_2$ — $C_6H_4$ — OH;

HO — $C_6H_{10}$— $CH_2$— C $(CH_2Br)_2$ — $CH_2$— $C_6H_{10}$— OH;

OH — $C_5H_8$ — $CH_2$ — C $(CH_2Br)_2$ — $CH_2$ — $C_5H_8$ — OH;

H-$[OC_2H_4]_n$— O — $CH_2$— C $(CH_2Br)_2$— $CH_2$ — O — $[C_2H_4$—$O]_n$H

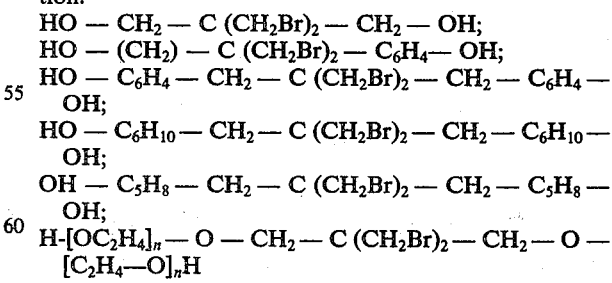

HO — $CH_2$ — C $(CH_2Cl)$ $(CH_2Br)$ — $CH_2$ — OH

HO — CH$_2$ — C (C$_4$H$_8$Br)$_2$ — CH$_2$ — OH, and the like.

Also listed below are the various carbamoyl chloride materials that may be reacted with any one of the aforementioned alcohols.

Cl — C(O) — NR$_2$;
Cl — C(O) — NH$_2$;
Cl — C(O) — N(H) CH$_3$;
Cl — C(O) — N(H) C$_4$H$_9$;
Cl — C(O) — N(H) C$_6$H$_5$;
Cl — C(O) — N(H) C$_5$H$_9$ and the like.

In preparing those compounds containing the R$^1$ substitutent of alkylene or oxyalkylene substituted by the group — O — C(O) NR$_2$, one reacts the above identified carbamoyl chloride with an alcoholic precursor having not only terminal hydroxyl groups, but also hydroxyl groups pendant from the appropriate alkylene or oxyalkylene precursor. This therefore results in pendant groups of the structure — O — C(O) NR$_2$ providing a sufficient amount of carbamyl chloride is employed.

Use of the Compositions

As mentioned above, the compounds of the present invention are useful for imparting a flame retardant property to combustible material. By "combustible material" is meant a material which of its own nature have a tendency to burn when flamed. Flame retardancies can be determined for textile materials in accordance with test AATCC base 34-1952, American Association of Textile Chemists and Colorists. A particularly stringent government standard for flamability is Department of Commerce Standard FF-3-71. The compounds of the present invention are particularly useful in imparting a flame retardant property or characteristic to cellolose materials. The cellulose materials which can be treated to impart flame retardant properties thereto in accordance with this invention include cotton, rayon, paper, jute, ramie, wood and mixtures thereof, as well as blends of cellulosics, such as cotton or rayon with synthetic blends, such as nylon, polyesters, acrylics and with proteinaceous fibers, such as wool and the like. The compounds of the present invention are particularly effective when applied to the cellulosic containing fabrics such as cotton and rayon, as well as blends of said cellulosic materials such as polyester cotton, wherein the amount of the polyester preferably is greater than 25% of the fabric, such as 50% or 75%.

The normal treatment of the cellulosic fabric comprises:

Padding a fabric with a solution of the aforementioned novel compositions, drying such fabric, and curing the thus treated fabric. Frequently, before the flame retardant material is applied to the fabric, earlier pretreatments are applied such as desizing the fabric, scouring or washing the fabric in a commerically available detergent, bleaching the fabric, and washing the fabric again. Then the compounds of the present invention are applied in a solution. In some instances, it is also desirable that the fabric be dried prior to the application of the solution of the compounds of the present invention. Although the brominated materials of the present invention may be applied alone i.e., without other flame retarding compositions, a preferred sequence of applying the flame retardant composition of the present invention is to em ploy additional flame retardant compositions, such as, phosphorus containing materials in combination with the compounds of the present invention. This may be provided by applying in one bath a combination of the brominated materials of the present invention together with the phosphorus containing material. Alternatively, the brominated materials may be applied sequentially, that is, the fabric is treated with the brominated materials and subsequently treated with the phosphorus containing materials. Alternatively, a sequential process can be followed wherein the phosphorus containing materials are applied to the desired fabric and then the brominated materials are applied. The most preferred process is where the brominated materials of the present invention are applied in one bath with desirable phosphorus containing materials. See the aforementioned references for a listing of various phosphorus containing materials that may be employed in conjunction with the brominated compounds of the present invention. See also U.S. Pat. No. 3,421,923 for teachings as to various techniques for applying desirable phosphorus containing materials, which description is incorporated by reference.

It is to be appreciated that the amount of the phosphorous flame retardant material that may be employed can vary substantially. In essence the amount employed should be such that it is effective to impart a flame retardant property to the combustible substrate or material. In general preferred phosphorous flame retardants are Pyrovatex [trade mark of Ciba-Geigy for (CH$_3$O)$_2$ — P(O) — C$_2$H$_4$ — C(O) NHCH$_2$OH], tetrakis (alpha-hydroxy organo) phosphonium hydroxide or salts, such as the inorganic salts as the halides, sulfates and the like or the organic salts such as the acetates, formates, oxalates and the like.

The tetrakis (alpha-hydroxyorgano) phosphonium compounds of the subject composition may be further defined as a compound having the formula:

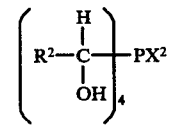

wherein R$^2$ is selected from the group consisting of hydrogen, lower alkyls having between about 1 and about 6 carbon atoms, halogenated lower alkyls having between about 1 and about 6 carbon atoms, lower alkenyls having between about 1 and about 6 carbon atoms, halogenated lower alkenyls having between about 1 and about 6 carbon atoms, aryls having between about 6 and about 10 carbon atoms, halogenated aryls having between about 6 and about 10 carbon atoms, cycloalkyls having between about 3 and about 6 carbon atoms, halogenated cycloalkyls having between about 3 and about 6 carbon atoms, and X$^2$ is a halogen, such as chlorine, bromine, fluorine or iodine. Typical examples of suitable tetrakis (alpha-hydroxyorgano) phosphonium halide compounds are tetrakis (hydroxymethyl) phosphonium chloride, tetrakis (hydroxymethyl) phosphonium bromide, tetrakis (alpha-hydroxyethyl) phosphonium chloride, tetrakis (alpha-hydroxypropyl) phosphonium chloride, tetrakis (alphahydroxyallyl) phosphonium chloride, tetrakis (alpha-hydroxybenzyl) phosphonium chloride, tetrakis (alpha-hydroxymethylcyclohexyl) phosphonium chloride, tetrakis (alpha-hydroxypropenyl) phosphonium chloride, tetrakis (alpha-hydroxybutenyl) phosphonium chloride and mixtures thereof. The phosphonium compounds may be used in monomer form or in a partially polymerized for, so long as they are still water soluble. For example, tetrakis (hydroxymethyl) phosphonium chloride, which is the preferred phosphonium compound, may be heated to effect partial polymerization before dissolving it in the solution.

The tetrakis (alpha-hydroxy organo) phosphonium hydroxide useful in the present invention may have the formula

wherein $R^2$ has the above described meaning. The preferred material is tetrakis (hydroxy methyl) phosphonium hydroxide.

When applying the compounds of the present invention to a substrate such as, fabric which is to be rendered flame retardant, a solution of the compounds of the present invention is employed. The most preferred solution is an aqueous solution. However, other solvents may be employed providing the novel compounds are soluble therein, such as alkanols of from 1 to 4 carbon atoms, aromatic solvents, such as benzene toluene, xylene and the like, and chlorinated solvents such as chlorinated hydrocarbons of from 1 to 4 carbon atoms, and the like. Therefore the phosphonium salts should be soluble therein.

The compounds of the present invention when applied to the fabric, should be applied such that there is a resin add on of from 10 to 200%. When the compounds of the present invention are used in conjunction with flame retardant phosphorus compositions in one bath, the ratio of the compounds, on a weight basis, should be from 1 to 10: 10 to 1, of brominated carbamoyl: phosphorus containing compositions.

The most preferred flame retardant composition of the present invention contains the N-methylol derivatives used in conjunction with tetrakis (hydroxy methyl) phosphonium chloride or hydroxide, most preferably the chloride.

When a solution of tetrakis (hydroxy methyl) phosphonium hydroxide is used to impregnate the cellulosic containing fabric, it is to be appreciated that it is in equilibrium with tris (hydroxy methyl) phosphine. Such a solution is well known in this art and can be prepared by reacting a aqueous solution of tetrakis (hydroxymethyl) phosphonium chloride with an approximately equimolar quantity of an organic or inorganic base, preferably sodium hydroxide. The pH of the final solution is adjusted to from 7 to 9 and preferably to from 7.5 to 8.1. For the purpose of this invention, the active component of the aqueous solution is considered to be tetrakis (hydroxymethyl) phosphonium hydroxide. Hereinafter, the active component will be expressed in terms of this component, although it is probable that there is present a mixture of tris (hydroxymethyl) phosphine and tetrakis (hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet pick-up of from about 10 to about 200% may suitably be used, preferably the material contains final resin add-on of about 15 - 35%.

Of the above enumerated carbamoyl derivatives that may be employed in the imparting of a flame retardant property to the cellulosic materials, the most preferred compounds are those that contain the group — $CH_2Br$ for the X substitutent. While the X substitutent may be varied, it is preferred that the compositions impart durable flame retardance to the cellulosic material. Therefore those materials that contain substitutents which may undergo dehydrohalogenation are less preferred due to their possible long term instability.

EXAMPLE 1

Preparation of Biscarbamoyl Dibromoneopentane

Method A

Into a three necked flask (1 liter) which acts as receiver for carbamoyl chloride was placed 26 gr. (0.10 mole) of dibromoneopentyl glycol (DBNPG) in 100ml of dry tetraydrofuran (THF). The flask was fitted with the condenser unit of the hot-tube reactor used for generating carbamoyl chloride. To the reaction flask was added (direct from generator) 20 gr. (0.25 mole) of carbamoyl chloride. The flask was cooled to 0° - 5° C with an ice-water bath and 15 gr. of pyridine was added through a dropping (addition) funnel over 15 min. After stirring at room temperature overnight (precipitate of pyridine .HCl formed over 30 min.) the THF suspension was stripped in vacuo (rotary evaporator) of solvent and the solid residue (pulverized) suspended in 200ml distilled water (dissolve pyridine .HCl) and allowed to stir for 2 hours. The remaining solids were suction filtered and air dried. Thirty-two grams (32 gr.) of crude product, representing a yield of 91.5% was isolated. Analysis and product identification by H'NMR spectroscopy indicated 90 - 95% purity for biscarbamoyl dibromoneopentane.

Recrystallization of a small quantity of crude from ethanol realized white crystalline needles, m.p. 176v20 - 178° C.

| Combustion anal. | Calcd. for | $C_7H_{12}Br_2N_2O_4$ | Found |
|---|---|---|---|
| | 24.10% C | | 23.96% C |
| | 3.45% H | | 3.44% H |
| | 8.05% N | | 7.80% N |
| | 46.00% Br | | 45.73% Br |

Method B

Into a one liter 3 -necked flask fitted with an additional funnel, stirrer and drying tubes was placed a solution of dibromoneopentyl glycol 26 gr. (0.1 mole) in 100ml of pyridine. To the stirred solution, cooled to 0° - 5° C with an ice water bath, was added 31.2 gr. (0.2 mole) of phenyl chloroformate slowly over 30 min. Pyridine .HCl separated gradually over 1 hour as a white solid. After stirring at room temperature ture overnight, 200ml of distilled water was added, whereupon the pyridine .HCl dissolved a water-white oil separated and solidified. The liquid was decanted and the solid dissolved in a 1:1 v/v $CHCl_3/C_2H_5 — O — C_2H_5$ solution (300ml). The resultant solution was extracted sequentially with 2 × 100 ml 15% HCl (aq.), 2 × 100ml saturated aqueous $NaHCO_3$ and 1 × 100ml water. After drying over $MgSO_4$ the product solution was stripped in vacuo to a milk-white solid. Yield of crude bis(phenyl carbonato)dibromoneopentane 40 gr. (80%).

The product (40 gr.) from the above reaction was dissolved in a 1:1 $C_2H_5 — O — C_2H_5/CHCl_3$ solution (200ml) and added to 200ml of liquid ammonia at (−) 33° C. The reaction (flask fitted with Dry-Ice condenser) was allowed to reflux at (−) 33° C for 5 hours followed by an overnight evaporation. The precipitated solid produced was suction filtered and washed with several portions of fresh ether and dried. The crude product was recrystallized from ETOH as white needles in a yield of 200 gr. (72% theory). Analysis as in Method A.

EXAMPLE 2

Preparation of N,N,N' - Trishydroxymethyl Biscarbamoyl Dibromoneopentane

Method A

Into a 500ml 1-neck round-bottom flask was placed 74gr. (0.9 mole) of 37% aqueous formalin and 50ml of distilled water. The pH of the solution was adjusted to 8 – 9 with 10% aqueous NaOH. Biscarbamyl dibromoneopentane (105 gr., 0.3 mole) was added to the reaction flask and the resultant suspension stirred vigorously with stirring motor/paddle. The mixture was heated and maintained at 45° C until solution was attained (ca. 1.5 hours) followed by stripping in vacuo (50° C, 20mm) on a rotary evaporator to constant weight. Yield of crude colorless oil - 125 gr., representing 96% of theory.

Analysis of the crude product by H'nmr (dimethyl sulfoxide - $d_6$ + tetramethyl silane) was consistent with the desired product.

It is appreciated that by employing a lesser quantity of formalin, a lower degree of hydroxymethylation can be achieved.

EXAMPLE 3

The product of Example 2 was diluted with water to a 15% concentration, padded onto 50/50 polyester-cotton fabric dried 2.5 min./200° F, and cured 1.5 min./300° F. After scouring the treated cloth (6.7% resin add-on was top-treated in a second step with a 20% aqueous padding of tetrakis (hydroxymethyl) phosphonium hydroxide (THPOH). The fabric was dried 1.5 min./20° F, curred 2 min./ammonia gas and scoured (resin add-on 8.9%, total resin add-on 15.6%). After 50 home launderings (HW) the treated cloth was found to retain its flame retardant property, as shown below:

| Vertical Char (12 sec.) | Oxygen Index* |
|---|---|
| Initial - 4" | Initial - 29 |
| 50 HW - 4" | 50 HW - 28 |

*OI of untreated 50/50 PE/cotton - 17.6

Range of concentrations effective for this application are 12 – 20% brominated carbamoyl derivative (3 formalin equivalents) and 18 – 25% THPOH.

Range of temperature (heat cure bromine derivative): 300° – 320° F/1.0 – 2.5 min.

Range of temperature (dry for both treatments): 200° – 220° F/1.5 – 2.5 min.

The above conditions (preferred in text of example) yield good durable flame retardance with good color and "hand".

EXAMPLE 4

A 50% aqueous solution of THPOH was formulated with an equal volume of a 32% aqueous solution of the product of Example 2. The resultant solution (41% solids) was padded onto 50/50 polyester-cotton fabric, dried at 200° F/1 min., cured at 320° F/1 min., redampened and post-ammoniated for 3 min. with NH₃ gas.

After scouring, the treated fabric had 17.9% resin add-on. Laundering through 25 home washes showed durable flame retardance, as shown below:

| Vertical Char (12 sec.) | Oxygen Index* |
|---|---|
| Initial - 4¼" | Initial - 29 |
| 25 HW - 5" | 25 HW - 28 |

*OI of untreated 50/50 PE/cotton - 17.6

Range of concentrations effective for this application are 22 – 25% THPOH coupled with 16 – 12% brominated carbamoyl derivative.

Range of temperature (dry): 200° F/1.0 – 2.0 min.

Range of temperature (cure): 300° – 320° F/1.0 – 2.5 min.

This range of conditions (preferred cited in text of example) realizes good flame retardant property with good color and "hand".

EXAMPLE 5

Application of N-Methylol (3 equiv. $CH_2O$) Derivative of Biscarbamoyl Dibromoneopentane to 100% Cotton and 50/50 PE/cotton Tris (N-methylol) biscarbamoyl dibromoneopentane, prepared according to Example 2, was diluted with water to a 44% aqueous solution. Monsanto Catalyst AC (5%) (trademark for 2-amino-2-methyl propanol .HCl) was added and the solution padded unto separate fabrics of 100% cotton and 50/50 polyester/cotton. The fabric samples were dried at 200° F/2 min., cured at 320° F/2 ½ min. and scoured. After line drying, the 100% cotton sample had 34.7% resin add-on and the 50/50 PE/cotton had 27.7% resin add-on. Durable flame resistivity was indicated by oxygen index levels through 25 launderings.

| Oxygen Index (100% Cotton)* | Oxygen Index (50/50 PE/Cotton)** |
|---|---|
| Initial - 25 | Initial - 25 |
| 25 HW - 24 | 25 HW - 25 |

*O.I. of untreated 100% cotton - 20.1
**O.I. of untreated 50/50 PE/Cotton - 17.6

EXAMPLE 6

One step Application of N-Methylol (3 Equiv. $CH_2O$) Derivative of Biscarbamoyl Dibromoneopentane Formulated with Tetrakis Hydroxy Methyl Phosphonium Chloride Composition A 40% (based on phosphorous compound) solution of a phosphorous composition containing the following components:

| 80 | gms | tetrakis (hydroxy methyl) phosphonium chloride (80% by weight) |
| 14.3 | gms | NaOH (50% by weight) |
| 13.1 | gms | urea |
| 16.7 | gms | trimethylol melamine |
| 72 | gms | water | was add-mixed with a 20% aqueous solution of tris (N-methylol) biscarbamoyl dibromoneopentane (see Example 2 above) in an equal volume basis. The resultant solution (ea. 36% total solids) was padded unto 50/50 PE/cotton, dried at 200° F/2 min., cured at 300° F/2 min., redampened and post-ammoniated for 2 min.

with NH₃ gas. After scouring the treated cloth had 18.1% resin add-on. Durable flame retardance through 50 launderings (HW) was indicated.

| Vertical Char. (12 sec.) | Oxygen Index* |
|---|---|
| Initial - 5" | Initial - 28 |
| 50 HW - 5¼" | 50 HW - 28 |

*O.I. of untreated 50/50 PE/cotton - 17.6

Range of concentrations effective for this application are: 1) 40% phosphorous composition (based on weight of phosphorous compound) coupled with equal volumes of 20% - 40% aqueous solutions of brominated derivatives: 2) 35% phosphorous composition (based on weight of phosphorous compound) with 25% - 40% brominated derivatives; 3) 30% phosphorous composition (based on weight of phosphorous compound) with 30% - 50% brominated derivatives.

Range of cure temperatures (dry temp./time constant) are: 300° F - 320° F/1.5 - 2.5 min.

EXAMPLE 7

A brominated carbamoyl derivative of the structure H₂N C(O)O — CH₂ — C(CH₂Br)₂ — CH₂ — O — (O) — CNH₂ was formulated with tetrakis (hydroxy methyl) phosphonium chloride (80% by weight in water) at pH + 1, 80° C in a 1:4 parts by weight ratio with two equivalents of 37% (by weight) formalin. The colorless product was diluted to 45% solution with water, padded onto 50/50 polyester cotton fabric and dried (200 F/1 min.) and cured with ammonia gas. After scouring, the treated cloth had 17% resin add-on. It was subjected to home washings and found to retain flame retarding properties, i.e., an oxygen index (OI) of 28 and vertical char. of 5 ¼inch.

In order to improve the flame retardancy imparting property of the compounds of the present invention, it has been found desirable to add an equivalent of formalin for each hydrogen attached to the amide groups. While applicant does not wish to be found by any theory of the invention, it is believed that the most durable flame retardancy for cellulosic materials is obtained when the group — CH₂OH is attached to the nitrogen of the amide group. This facilitates reaction with the cellulosic material thereby binding the compounds of the present invention to the cellulose structure.

EXAMPLE 8

A polyester/cotton fabric (50% by weight/50%) which was pre-treated* which burns on its own, was padded with a 20% aqueous solution of a compound of the structure HOCH₂NH C— (O) — O — CH₂ — C (CH₂Br)₂ — CH₂ — O — (O) CNHCH₂OH, dried at 200 F/2 ½ min. and cured at 320 F/2 ½ min. After scouring with a solution of Na₂CO₃ and sodium perborate the swatches were tested for flame retardancy then subjected to 50 home washings (HW) and retested by OI and vertical char:

| OI | Char. (Inches) |
|---|---|
| Initial - 29 | 3⅞" |
| 50 HW - 28 | 4¼" |

*The fabric was pre-treated by applying an aqueous solution (10% by weight) of tetrakis (hydroxy methyl) phosphonium chloride, having a pH of about 9, resulting in the appropriate phosphonium hydroxide derivative. After impregnating the fabric, it was cured in-an-ammonia atmosphere.

I claim:
1. Brominated carbamoyl derivatives of the structure:

$$R_2N - C(O) - O - (R^1)_n - CH_2 - C(X)_2 - CH_2 - (R^1)_n - O - C(O)NR_2$$

wherein:
R is independently selected from the group consisting of hydrogen, alkyl, alkanol, cycloalkyl from 5 to 7 carbon atoms, phenyl, alkyl substituted by phenyl, phenyl substituted by alkyl, hydroxy terminated oxyalkylene, hydroxy substituted hydroxy terminated oxyalkylene and halogen substituted hydroxy terminated oxyalkylene;
R¹ is independently selected from the group consisting of alkylene; oxyalkylene; hydroxy substituted oxyalkylene, halogen substituted oxyalkylene and alkylene or oxyalkylene substituted by the group — O — C(O)NR₂;
X is selected from the group consisting of halogen and halogen substituted alkyl, wherein the halogen is chlorine or bromine; said alkyl, alkanol and alkylene each independently has from 1 to 4 carbon atoms; said oxyalkylene having from 2 to 4 carbon atoms; n is 0 to 20;
provided one of X is a bromo or a bromo substituted alkyl; and that each carbamoyl group has a replaceable hydrogen in the R group.
2. The compound of claim 1 wherein n is 0.
3. The compound of claim 1 wherein the terminal — NR₂ groups are — NH alkanol.
4. The compound of claim 1 wherein all R groups are hydrogen and n is 0.
5. The compound of claim 1 wherein X is —CH₂Br.
6. The compound of claim 1 wherein R¹ is alkylene.
7. The compound of claim 1 of the structure H₂NC(O)O — CH₂ — C (CH₂Br)₂ — CH₂ — O(O)CNH₂.

8. The compound of claim 1 of the structure

HO CH₂ NH—C(O) — O — CH₂ — C(CH₂Br)₂ — CH₂ — O — (O)CNH CH₂ OH.

9. A composition useful for imparting a flame retarding property to a combustible substrate comprising the compound of claim 1 in a solvent and present in an effective amount to impart a flame retarding property to the combustible substrate.
10. The composition of claim 9 wherein the combustible material is a cellulose containing composition.
11. The composition of claim 9 wherein n is 0.
12. The composition of claim 9 wherein the terminal — NR₂ groups are — NH alkanol.
13. The composition of claim 9 further comprising an effective flame retarding amount of a phosphorous-containing flame retardant material.
14. A method of imparting a flame retarding property to a combustible material comprising treating the combustible material by impregnating with an effective flame retarding imparting amount of the composition of claim 1.
15. The method of claim 14 wherein the combustible material is a cellulosic material.
16. The method of claim 14 wherein the n is 0.
17. The method of claim 14 wherein the terminal — NR₂ groups are — NH alkanol.
18. The product of the method of claim 14.

* * * * *

UNITED STATES PATENT OFFICE
CERTIFICATE OF CORRECTION

Patent No. 4,058,466           Dated November 15, 1977

Inventor(s) Daniel J. Scharf

It is certified that error appears in the above-identified patent and that said Letters Patent are hereby corrected as shown below:

Column 2, line 58, "OH-$C_5H_8$" should read -- HO-$C_5H_8$ --.

Column 6, line 17, "tetraydrofuran" should read

-- tetrahydrofuran --; line 53, "temperature ture" should read

-- terperature overnight --.

Signed and Sealed this

Sixteenth Day of May 1978

[SEAL]

Attest:

RUTH C. MASON
Attesting Officer

LUTRELLE F. PARKER
Acting Commissioner of Patents and Trademarks